July 1, 1952  J. D. McDONALD  2,602,100
BRUSH HOLDER
Filed May 11, 1951
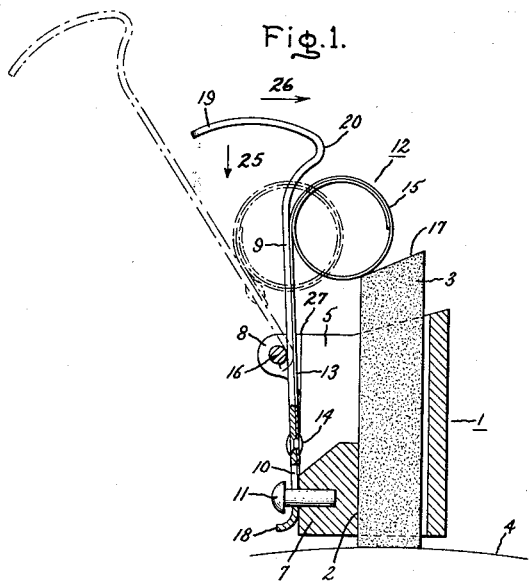
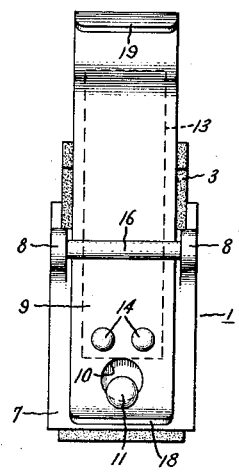
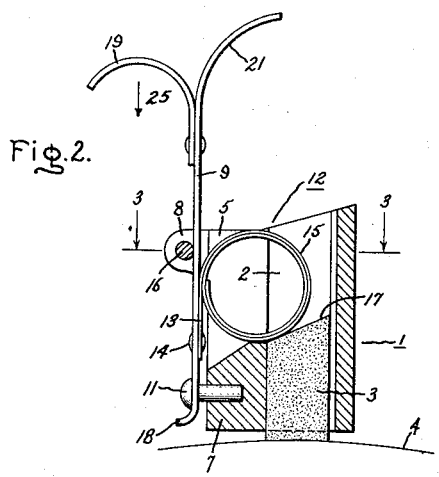
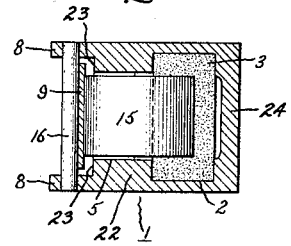
Inventor:
James D. McDonald,
by Ernest C. Britton
His Attorney.

Patented July 1, 1952

2,602,100

UNITED STATES PATENT OFFICE 2,602,100

BRUSH HOLDER

James D. McDonald, McKean, Pa., assignor to General Electric Company, a corporation of New York Application May 11, 1951, Serial No. 225,865

7 Claims. (Cl. 171—324)

This invention relates to brush holder assemblies for dynamoelectric machines and more particularly to brush holders of the type utilizing pre-stressed springs of the self-coiling type.

In the design of brush holder assemblies for dynamoelectric machines, it is desirable to provide a structure which permits the utilization of the longest possible brushes so that less frequent brush replacement is required and furthermore, it is desirable that the pressure of the brush on the current collector surface be uniform throughout the life of the brush. It is also important that the brush holder be simple and economical to manufacture and occupy minimum space. The provision of a brush holder utilizing a spring of the pre-stressed, self-coiling type accomplishes the above objectives. However, it is still necessary to provide a structure wherein the worn brushes can be readily removed and in which the spring will not pop out of the workman's hand when the brushes are being changed or repaired.

An object of this invention is, therefore, to provide an improved brush holder of the type utilizing a pre-stressed, self-coiling spring.

Further objects and advantages of this invention will become apparent and the invention will be better understood by reference to the following description and the accompanying drawing, and the features of novelty which characterize this invention will be pointed out with particularity in the claims annexed to and forming a part of the specification.

In accordance with a preferred embodiment of this invention, there is provided a brush holder assembly having a brush supporting member with a longitudinal opening formed therein to accommodate a brush for longitudinal movement toward a current collector surface. An elongated spring is provided for resiliently urging the brush against the current collector surface, the spring being formed of a relatively thin strip of spring material pre-stressed so that its resiliency normally urges it to form a spiral coil in its longitudinal direction. A back plate member is provided having one end of the spring secured thereto adjacent the current collector end thereof so that the remainder of the spring forms a coil tending to roll toward the secured end thereof and a handle portion is formed at the end of the back plate member remote from the current collector end. Means are provided for removably securing the current collector end of the back plate member to the brush supporting member adjacent its current collector end so that the coiled portion of the spring engages the end of the brush remote from the current collector surface and means are provided on the brush support for retaining the back plate member in its brush-engaging position. The back plate member is adapted to be manually released from the engaging means by means of the handle and is provided with means adjacent its current collector end for engaging the retaining means so that the spring does not force the back plate member out of the brush holder assembly. The engaging means at the current collector end of the back plate member permits the back plate member to be manually pivoted about the retaining means to release the coiled portion of said spring from engagement with the brush, to permit removal thereof.

In the drawing, Fig. 1 is a side elevational view, partly in section, of the improved brush holder assembly of this invention showing the back plate member in its engaged position (solid lines) and also showing the back plate member after it is released from its engaged position and pivoted to disengage the coiled portion of the spring from the brush (dashed lines); Fig. 2 is another side elevational view, partly in section, illustrating the improved brush holder assembly with a worn brush and an alternative type of handle; Fig. 3 is a cross-sectional view taken along the line 3—3 of Fig. 2; and Fig. 4 is an end view of the device.

Referring now to the drawing, there is shown a brush supporting member 1 which may be secured to the frame of the dynamoelectric machine (not shown) in any suitable manner. The brush support 1 has a longitudinal brush guiding opening 2 formed therein adapted to receive a suitable brush 3 for longitudinal movement toward a current collector surface 4 of the dynamoelectric machine, which may be either a commutator or a slip ring. The wall 22 of the brush supporting member 1 has a longitudinally extending slot 5 formed therein communicating with the brush-guiding opening 2 and extending from the end of the brush holder support 1 remote from the current collector surface 4 toward the current collector end of the brush holder support, leaving a bridging portion 7 at the base thereof adjacent the current collector 4. A pair of ears 8 extend from the wall 22 of the brush supporting member 1 on either side of the slot 5, these ears being spaced apart by a distance greater than the width of the slot 5, thus defining end walls 23 on either side of the slot 5.

In order to provide for resiliently urging the brush 3, which may be formed of carbonaceous or other suitable material, against the current collector surface 4, the arrangement now to be described is provided. A back plate member 9 is provided having a brush-engaging position as shown in solid lines in Fig. 1. The back plate member 9 has an opening 10 formed therein adjacent its current collector end which is adapted to engage a pin 11 in the bridging portion 7 of the brush holder supporting member 1. A spring 12 is provided having one end 13 secured to the back plate member 9 adjacent its current collector end in any suitable manner, as by rivets 14. The spring 12 is formed of a relatively thin strip of spring metal, narrower than the width of the slot 5, pre-stressed prior to assembly so that it normally forms a spiral coil in its longitudinal direction. With the end 13 of the spring secured to the back plate member 9, as just described, the remaining portion of the spring tends to form a coiled portion 15. A retaining pin 16 extends between the ears 8 of the brush holder support 1 and is spaced from the end walls 23 by a distance slightly in excess of the width of the back plate member 9. The back plate member 9, as shown in Fig. 3, is wider than the spring 12 and the slot 5. As shown in solid lines in Figs 1, 2 and 3, in its engaged position, with the opening 10 engaging the pin 11, the back plate member 9 extends through the space between the retaining pin 16 and the end walls 23 so that the coiled portion 15 of the spring 12 engages the end 17 of the brush 3 remote from the current collector surface 4. By sloping the upper end 17 of the brush 3, as shown in Figs. 1 and 2, the coiled portion 15 of spring 12 will in addition to supplying the vertical component of pressure on the brush, also supply a transverse component to urge the brush against the end wall 24 of the brush support member 1 to prevent chattering. In the position shown in Fig. 1 in solid lines, with the coiled portion 15 of the spring 12 above the retaining pin 16, the transverse pressure of the spring of the coiled portion 15 against the end 17 of the brush 3 biases the back plate member 9 against the pin 16 which therefore serves to retain the back plate and spring assembly in the engaged position.

As the brush 3 is worn, as shown in Fig. 2, the spring 12 forms the coil 15 tending to move toward its secured end 13 so that the brush is resiliently biased with constant pressure toward the current collector surface 4. As the brush continues to wear, the slot 5, being wider than the spring 12, accommodates the downward movement of the coiled portion 15 of the spring 12. As pointed out above, and as shown in Fig. 1 in solid lines, when the coiled portion 15 of the spring 12 is above the retaining pin 16, the back plate 9 is biased against the pin 16 causing a pivoting action which biases the current collector end of the back plate member 9 against the bridging portion 7 of the brush support 1. Also, in this position, a vertical component of force exerted by the spring 15 against the brush 3 produces a corresponding vertical force upward on the back plate member 9, so that the bottom portion of the opening 10, which as will be seen from Fig. 4, is larger than the head of the pin 11, is seated against the shank of pin 11. When the brush is worn, as shown in Fig. 2, so that the coiled portion 15 of the spring 12 is below the retaining pin 16, the back plate member 9 is still biased against the retaining pin 16. However, the current collector end is now biased against the head of the pin 11, rather than against the bridging portion 7 of the brush support 1.

In order to release the back plate member and spring assembly from its engaged position shown in solid lines in Fig. 1 and in Fig. 2, the handle 19 is manually depressed downward so that the opening 10 may be disengaged from the head of the pin 11. When the coiled portion 15 of the spring 12 is in the position shown by solid lines in Fig. 1, if the back plate and spring assembly is to be released from its engaged position, the manual pressure on the handle 19 must be downward as shown by the arrow 25 and transverse as shown by the arrow 26, in order to push the back plate member downward against the force of the coiled portion 15 of the spring 12 so that the opening 10 may be disengaged from the head of the pin 11 and to rotate the back plate about the upper edge 27 of the end walls 23, also against the force of the spring 15, to disengage the opening 10 from the head of the pin 11. When the coiled portion 15 of spring 12 has reached the position shown in Fig. 2, the spring is biasing the current collector end of the back plate member 9 outwardly against the head of the pin 11 so that it is merely necessary to apply downward pressure in the direction shown by the arrow 25 on the handle 19 to release the back plate and spring assembly since the force of the spring will complete disengagement of the current collector end of the back plate member 9 from the head of the pin 11.

Referring to Fig. 1, it will be readily seen that if the back plate member 9 is disengaged from the pin 11, the tendency of the spring 15 to form a coil toward its secured end 13 would cause the back plate and spring assembly to pop out of the brush holder. To prevent this popping out, the back plate member 9 is provided with a hooked portion 18 at its current collector end which engages the retaining pin 16 after the back plate member 9 has been disengaged from the pin 11. In this position, the back plate member 9 with the coiled spring 12, as shown in Fig. 1, may be manually pivoted about the pin 16 so that the coiled portion 15 of the spring 12 is disengaged from the end 17 of the brush 3. The handle 19 of the back plate member 9 is shown as having a reverse band, as at 20, in order to provide a guard against bending the spring 12 over backward which is detrimental to the spring. When the brush is completely worn, as shown in Fig. 2, there is little or no tendency for the coiled portion 15 of the spring 12 to pop the back plate member 9 out of the holder, and in this case, the handle 19 permits manually raising the back plate member until the hooked portion 18 engages the pin 16 after which the assembly may be pivoted as shown in Fig. 1. In Fig. 2, the handle 19 is shown with a separate guard 21 to accomplish the same purpose as the reverse band 20 of Fig. 1.

It will now be readily apparent that the improved brush holder assembly of this invention is characterized by its simplicity and economy of manufacture and furthermore occupies a minimum of space. The characteristic of the pre-stressed, self-coiling type of spring utilized provides uniform pressure on the brush regardless of its length thereby securing greatly increased brush life. This construction permits the use of brushes of maximum life length thereby necessitating less frequent brush replacement. The low inertia characteristic of this type of spring improves commutation and the back plate mounting arrangement permits easy changing of the brushes and also prevents the spring from popping out into the workman's hand when changing brushes.

While I have illustrated and described a particular embodiment of this invention, further modifications and improvements will occur to those skilled in the art. I desire it to be understood, therefore, that this invention is not limited to the embodiment shown and I intend in the appended claims to cover all modifications which do not depart from the spirit and scope of this invention.

What I claim as new and desire to secure by Letters Patent of the United States is:

1. A brush holder assembly comprising a brush support having a longitudinal opening formed therein adapted to have a brush arranged therein for longitudinal movement toward a current collector surface, an elongated spring for resiliently urging said brush against said current collector surface, said spring being normally urged by its resiliency to form a spiral coil in its longitudinal direction, a back plate member having one end of said spring secured thereto so that the remainder of said spring forms a coil tending to roll toward the secured end thereof, means for removably securing said back plate member to said brush support in a brush-engaging position with said coiled portion of said spring engaging the end of said brush remote from said current collector surface, and means on said brush support for retaining said back plate member in said brush-engaging position, said back plate member being adapted to be released from said securing means and having means for engaging said retaining means whereby said spring does not force said back plate member out of said brush holder assembly, said last-mentioned engaging means being adapted to pivot said back plate member about said retaining means to release said coiled portion of said spring from engagement with said brush.

2. A brush holder assembly comprising a brush support having a longitudinal opening formed therein adapted to have a brush arranged therein for longitudinal movement toward a current collector surface, an elongated spring for resiliently urging said brush against said current collector surface, said spring being normally urged by its resiliency to form a spiral coil in its longitudinal direction, a back plate member having one end of said spring secured to the current collector end thereof so that the remainder of said spring forms a coil tending to roll toward the secured end thereof, said back plate member having a handle formed at its end remote from said current collector end, engaging means on said brush support, means adjacent the current collector end of said back plate member for removably securing said back plate member to said brush support engaging means in a brush-engaging position with said coiled portion of said spring engaging the end of said brush remote from said current collector surface, and means on said brush support at the end thereof remote from said current collector surface for retaining said back plate member in said brush-engaging position, said back plate member being adapted to be released from said brush support engaging means and having means for engaging said retaining means whereby said spring does not force said back plate member out of said brush holder assembly, said last-named engaging means being adapted to pivot said back plate member about said retaining means to release said coiled portion of said spring from engaging with said brush.

3. A brush holder assembly comprising a brush support having a longitudinal opening formed therein adapted to have a brush arranged therein for longitudinal movement toward a current collector surface, an elongated spring for resiliently urging said brush against said current collector surface, said spring being normally urged by its resiliency to form a spiral coil in its longitudinal direction, a back plate member having one end of said spring secured to the current collector end thereof so that the remainder of said spring forms a coil tending to roll toward the secured end thereof, said back plate member having a handle formed at its end remote from said current collector end, said back plate member having an opening formed therein adjacent its current collector end, engaging means on said brush supporting member adjacent the current collector end thereof for engaging said back plate opening whereby said back plate member is removably secured to said brush support in a brush-engaging position with said coiled portion of said spring engaging the end of said brush remote from said current collector surface, means on said brush support at the end thereof remote from said current collector surface for engaging the side of said back plate member remote from said spring for retaining said back plate member in said brush-engaging position, said opening in back plate member being adapted to be released from said engaging means, said back plate member having other means for engaging said retaining means whereby said spring does not force said back plate member out of said brush holder assembly, said last-named engaging means being adapted to pivot said back plate member about said retaining means to release said coiled portion of said spring from engagement with said brush.

4. A brush holder assembly comprising a brush support having a longitudinal opening formed therein adapted to have a brush arranged therein for longitudinal movement toward a current collector surface, a wall of said brush supporting member having a longitudinal slot formed therein communicating with said opening and extending from the end of said brush support remote from said current collector surface toward the current collector end thereof, an elongated spring for resiliently urging said brush against said current collector surface, said spring being narrower than said longitudinal slot and being normally urged by its resiliency to form a spiral coil in its longitudinal direction, a back plate member having one end of said spring secured to the current collector end thereof so that the remainder of said spring forms a coil tending to roll toward said secured end thereof, said brush supporting member having engaging means at the base of said slot adjacent the current collector end thereof, means adjacent the current collector end of said back plate member for removably securing said back plate member to said engaging means whereby said back plate member is arranged in a brush-engaging position with said coiled portion of said spring engaging the end of said brush remote from said current collector surface, said longitudinal slot accommodating movement of said coiled portion of said spring toward said current collector surface, said back plate member being adapted to be manually released from said engaging means, retaining means on said brush support and extending across said slot at the end thereof remote from said current collector surface for retaining said back plate member in said brush-engaging position, said back plate member having means for engaging said retaining means whereby said spring does not force said back plate member out of said brush holder assembly when released from said first-mentioned engaging means, said last-mentioned engaging means being adapted to pivot said back plate member about said retaining means to release said coiled portion of said spring from engagement with said brush.

5. A brush holder assembly comprising a brush support having a longitudinal opening formed therein adapted to have a brush arranged therein for longitudinal movement toward a current collector surface, a wall of said support having longitudinal slot formed therein communicating with said opening and extending from the end of said support remote from said current collector surface toward the current collector end thereof, an elongated spring for resiliently urging said brush against said current collector surface, said spring being narrower than said longitudinal slot and being normally urged by its resiliency to form a spiral coil in its longitudinal direction, a back plate member having one end of said spring secured to the current collector end thereof so that the remainder of said spring forms a coil tending to roll toward the secured end thereof, said back plate member having a handle formed at its end remote from said current collector end, said back plate member having an opening formed therein adjacent its current collector end, engaging means on said brush support at the base of said slot adjacent the current collector end thereof for engaging said back plate opening for removably securing said back plate member to said brush support in a brush-engaging position with said coiled portion of said spring engaging the end of said brush remote from said current collector surface, retaining means on said brush support and extending across said slot at the end thereof remote from said current collector surface for engaging the side of said back plate member remote from said coiled portion of said spring for retaining said back plate member in said brush-engaging position, said opening of said back plate member being adapted to be manually released from engagement with said engaging means, said back plate member having means for engaging said retaining means when released from said first-mentioned engaging means whereby said spring does not force said back plate member out of said brush holder assembly, said last-mentioned engaging means being adapted to pivot said back plate member about said retaining means to release said coiled portion of said spring from engagement with said brush.

6. A brush holder assembly comprising a brush support having a longitudinal opening formed therein adapted to have a brush arranged therein for longitudinal movement toward a current collector surface, a wall of said support having a longitudinal slot formed therein communicating with said opening and extending from the end of said support remote from said current collector surface toward the current collector end thereof, an elongated spring for resiliently urging said brush against said current collector surface, said spring being narrower than said longitudinal slot and being normally urged by its resiliency to form a spiral coil in its longitudinal direction, a back plate member having one end of said spring secured to the current collector end thereof so that the remainder of said spring forms a coil tending to roll toward the secured end thereof, said back plate member having a handle formed at its end remote from said current collector end, engaging means on said brush support at the base of said slot adjacent the current collector end thereof, means adjacent the current collector end of said back plate member for removably securing said back plate member to said engaging means in a brush-engaging position with said coiled portion of said spring engaging the end of said brush remote from said current collector surface, said slot accommodating movement of said coiled portion of said spring toward said current collector surface as said brush is worn, a pin mounted on said brush support and extending across said slot at the end thereof remote from said current collector surface for engaging the side of said back plate member remote from said coiled portion of said spring for retaining said back plate member in said brush-engaging position, said back plate member being adapted to be released from said engaging means and having a hook formed on its current collector end for engaging said retaining means when said back plate member is disengaged from said first-mentioned engaging means whereby said spring does not force said back plate member out of said brush holder assembly, said hook being adapted to pivot said back plate member about said pin to release said coiled portion of said spring from engagement with said brush.

7. A brush holder assembly comprising a brush support having a longitudinal opening formed therein adapted to have a brush arranged therein for longitudinal movement toward a current collector surface, a wall of said support having a longitudinal slot formed therein communicating with said opening and extending from the end of said support remote from said current collector surface toward the current collector end thereof, an elongated spring for resiliently urging said brush against said current collector surface, said spring being narrower than said slot and being normally urged by its resiliency to form a spiral coil in its longitudinal direction, a back plate member having one end of said spring secured to the current collector end thereof so that the remainder of said spring forms a coil tending to roll toward the secured end thereof, said back plate member having a handle portion formed at its end remote from said current collector end, engaging means on said brush support at the base of said slot adjacent the current collector end thereof, means adjacent the current collector end of said back plate member for removably securing said back plate member to said engaging means in a brush-engaging position with said coiled portion of said spring engaging the end of said brush remote from said current collector surface, a pair of ears extending from said brush support wall on either side of said slot, said ears being spaced apart by a distance greater than the width of said slot defining end walls on said brush support on either side of said slot, a retaining pin extending between said ears, said pin being spaced from said end walls by a distance greater than the width of said back plate member, said back plate member being wider than the width of said slot, said back plate member in its brush-engaging position being arranged in the space between said retaining pin and said end walls, said retaining pin engaging the side of said back plate member remote from said coiled portion of said spring for retaining said back plate member in said brush-engaging position, said back plate member being adapted to be manually released from said engaging means and having a hook formed at its current collector end for engaging said retaining pin when said back plate member is disengaged from said engaging means whereby said spring does not force said back plate member out of said brush holder assembly, said hook being adapted to pivot said back plate member about said retaining pin to release said coiled portion of said spring from engagement with said brush.

JAMES D. McDONALD.

REFERENCES CITED

The following references are of record in the file of this patent:

UNITED STATES PATENTS

| Number | Name | Date |
|---|---|---|
| 122,288 | Smith | Dec. 26, 1871 |
| 728,273 | Mix | May 19, 1903 |
| 1,977,546 | Fornelius | Oct. 16, 1934 |
| 2,273,644 | Hope | Feb. 17, 1942 |